United States Patent [19]

Cote

[11] Patent Number: 4,654,560
[45] Date of Patent: Mar. 31, 1987

[54] THREE (3)-WAY LAMP HAVING A TUNGSTEN HALOGEN INNER ENVELOPE

[75] Inventor: Paul T. Cote, Cleveland Hts., Ohio

[73] Assignee: General Electric Company, Schenectady, N.Y.

[21] Appl. No.: 734,529

[22] Filed: May 16, 1985

[51] Int. Cl.⁴ .......................... H01J 7/44; H01J 17/34
[52] U.S. Cl. ........................................ 315/49; 315/58; 315/200 R
[58] Field of Search ................. 315/49, 51, 58, 200 R, 315/161, 210, 362

[56] References Cited

U.S. PATENT DOCUMENTS 3,836,814  9/1974  Rodriguez ...................... 315/200 R
4,398,130  8/1983  McFadyen et al. ................... 315/72
4,473,776  9/1984  Peters ..................................... 315/71

FOREIGN PATENT DOCUMENTS

WO85/01833  4/1985  PCT Int'l Appl. .

Primary Examiner—Palmer C. DeMeo
Assistant Examiner—Theodore Salindong
Attorney, Agent, or Firm—John P. McMahon; Philip L. Schlamp; Fred Jacob

[57] ABSTRACT

A three (3)-way lamp having a tungsten halogen-cycle inner envelope and an operating circuit for the inner envelope is disclosed. The operating circuit comprises a ballast element and two diodes lodged within the confines of the base of the lamp. The operating circuit allows the inner envelope to provide three different levels of illumination for the lamp while still maintaining the desired operation of the halogen additive within the inner envelope.

4 Claims, 4 Drawing Figures

THREE (3)-WAY LAMP HAVING A TUNGSTEN HALOGEN INNER ENVELOPE

BACKGROUND OF THE INVENTION

This invention relates to a general service incandescent lamp having an inner envelope serving as its main light source. More particularly, this invention relates to a three (3)-way incandescent lamp having a tungsten halogen-cycle inner envelope and an operating circuit for the inner envelope all lodged within the confines of the lamp itself.

Inner envelopes containing a tungsten filament along with a halogen additive have recently been employed in automotive headlamps and PAR lamps. The tungsten halogen-cycle inner envelope provides for an enhanced light source for the lamps in which they are employed.

The usage of a tungsten halogen-cycle inner envelope for incandescent lamps such as a three (3)-way incandescent lamp is desired. The typical three (3)-way incandescent lamp has low and high wattage type filaments supplying three different levels of illumination. The usage of two tungsten halogen-cycle inner envelopes to respectively replace the low and high wattage filaments is neither economically nor structurally advantageous. The placement of two separate tungsten halogen-cycle inner envelopes within the confines of the outer envelope of the lamp complicates the mounting structure and adds to the cost of the lamp. It is desired that a single tungsten halogen-cycle inner envelope be lodged within the incandescent lamp and operated so as to provide three different levels of illumination for the lamp.

The selection of the three levels of illumination must be carefully considered so as to take into account the range of operating parameters of the halogen-cycle inner envelope. It must be recognized that there is a limit to the range of operation of a tungsten halogen-cycle lamp, the effect of which is to limit the difference in possible levels of illumination for the lamp. If, for example, the lower illumination level is chosen so that the inner wall of the inner envelope is operated below a desired temperature, then the halogen cycle may not function properly possibly resulting in wall blackening and the halogen detrimentally and chemically attacking the filament and support members of the inner envelope. Selection of the desired illumination levels of the inner envelope must be accomplished in a predetermined manner so as to ensure obtainment of the desired performance of the lamp itself.

A single inner envelope having a single tungsten filament operated at three levels of illumination necessitates that a ballast or operating circuit be provided for the lamp. A ballast or operating circuit that allows a lamp having a single filament to be operated to provide three levels of illumination is commercially available from I. Q. Industries, Inc., of Cleveland, Ohio 44118 as their CONVERT-A-BULB TM product. The CONVERT-A-BULB product has a housing large enough for lodging the operating circuit, a male connector for inserting into a three-way socket of a lamp fixture and a female connector for accepting a medium screw-type base of the lamp having the single filament.

It is desired that the operating circuit for the single tungsten filament lodged within an inner envelope containing halogen be lodged within a medium screw-type base of the lamp itself and that the operating circuit provide the lamp with three different levels of illumination that are selected in accordance with the desired parameters of the tungsten-halogen inner envelope.

Accordingly, it is an object of the present invention to provide a three (3)-way incandescent lamp having an operating circuit lodged within the confines of the lamp itself and which operating circuit provides for three levels of illumination of the tungsten halogen-cycle inner envelope so as to provide the lamp with an enhanced and properly operated light source.

SUMMARY OF THE INVENTION

The present invention is directed to an improved incandescent lamp having an inner envelope and a ballast circuit for operating the inner envelope to provide multi-levels of illumination all lodged within the lamp itself. The lamp comprises an outer envelope having spatially disposed therein the inner envelope and a ballast element. The inner envelope contains a tungsten filament and a halogen additive along with a relatively high pressure fill gas. A glass stem is provided having structural and electrical means for connecting to the inner envelope and the ballast filament. The lamp further comprises an electrically conductive screw-type base connected to the electrical means of the glass stem with the base comprising first, second and third conductive portions or contacts adapted to mate with an electrical socket. The socket further has switching means which selectively route a first side of an applied electrical A.C. excitation to its first, second, and third contacts. A first end of the inner envelope is connected to the first conductive portion of said base which is adapted to a common terminal of said socket having the second side of said electrical excitation A.C. applied thereto. The second end of said inner envelope is connected to a first end of said ballast element. The other end of the ballast element is connected to said second portion of said base. The switching means further has a common terminal connected to the first side of the electrical excitation. The first and third contacts of the switching means are interconnected to each other, and, similarly, second and third contacts are interconnected to each other. The lamp further comprises an operating circuit having the ballast element and a first and a second diode lodged within the confines of the electrical conductive base. The first diode having its anode connected to the first end of the ballast element and its cathode connected to the second conductive portion of said base. The second diode has its cathode connected to the first end of the ballast element and its anode connected to the second conductive portion of said base.

DETAILED DESCRIPTION OF THE PREFERRED EMBODIMENT

Figure 1:
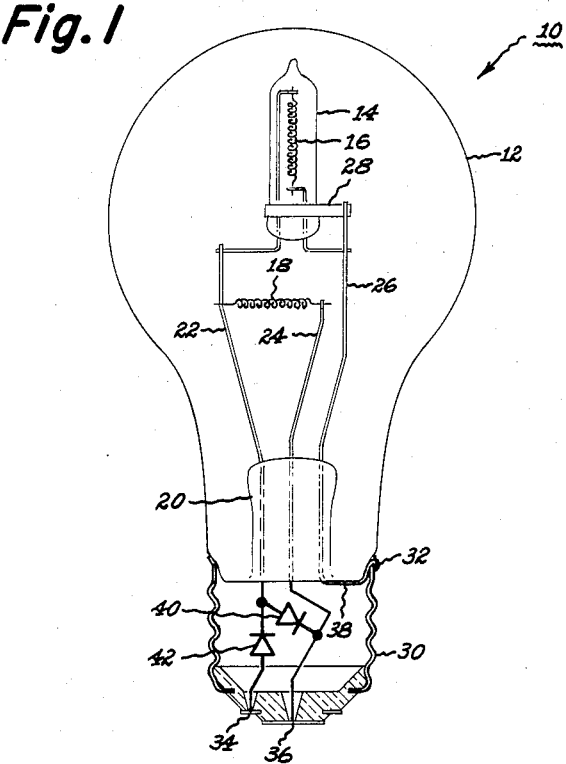
FIG. 1 schematically illustrates a three (3)-way incandescent lamp in accordance with one embodiment of the present invention.

FIG. 1 is an exposed view illustrating a three (3)-way tungsten-halogen incandescent lamp 10 in accordance with one embodiment of the present invention. The lamp 10 has an outer envelope 12 and an inner envelope 14 containing a tungsten filament 16 along with a halogen additive and a relatively high pressure fill-gas. The lamp 10 of FIG. 1 further comprises a ballast filament 18. The lamp 10 further has a glass stem 20 having electrical and structural members 22, 24 and 26 sealed therein.

The member 22 has its first end connected to both a first lead-in of the tungsten filament 16 and to a first end of the ballast filament 18. These connections form a node between the inner envelope 14 and the ballast filament 18. The member 24 is connected to the second end of the ballast filament 18. The electrical member 26 is connected to the second lead-in of the tungsten filament 16. The inner envelope 14 is rigidly held in position within the outer envelope 12 by means of a strap member 28 placed about the pinch seal area of the inner envelope 14 and connected to member 26.

The lamp 10 further comprises an electrically conductive base 30 connected to the members 22, 24 and 26 of the glass stem 20. The base 30 has first 32, second 34, and third 36 conductive portions which are adapted to mate with an electrical socket to provide for three different levels of illumination, to be described, for the three-(3)-way lamp 10.

Figure 2:
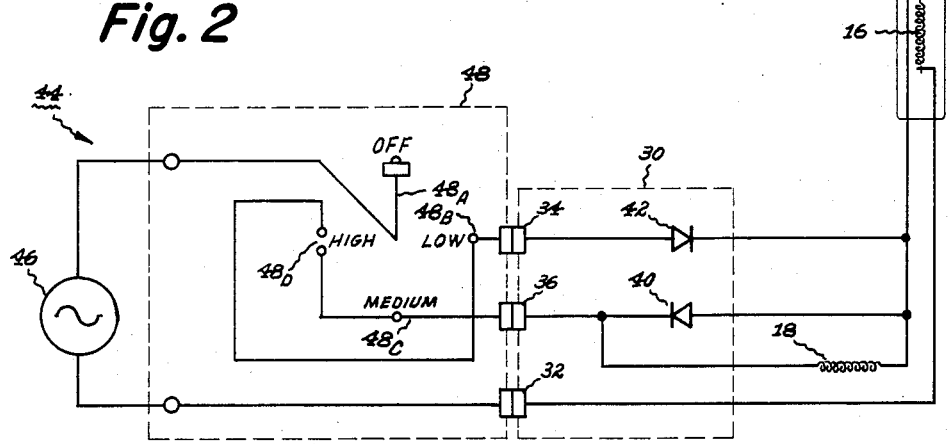
FIG. 2 is a diagram illustrating the operating circuit shown in FIG. 1.

The first portion 32 by means of a fuse wire 38 is connected to one side member 26 of which side member has its other side connected to the second end of the inner envelope 14. The third portion 36 is connected to the cathode of a first diode 40 which has its anode connected to the member 22. The third portion 36 is also connected to member 24. The second portion 34 is connected to the anode of a second diode 42 which has its cathode connected to the member 22. The first 40 and second 42 diodes along with the ballast filament 18 comprise the operating circuit of the present invention and which is also shown in FIG. 2, as arranged with a three-way electrical socket 44.

The socket 44 has appropriate means, shown as plurality of solid rectangular and circular symbols, some of which accept the first and second sides of an applied alternating current (A.C.) excitation 46. The first side of the A.C. excitation 46 is connected to the common $48_A$ terminal of a switching means 48.

The switching means 48 selectively routes the first side of the applied A.C. excitation to a first or LOW contact $48_B$, a second or MEDIUM contact $48_C$, and a third or HIGH contact $48_D$. The HIGH contact $48_D$ has two portions, one of which is further connected to contact $48_B$ and the other of which is connected to contact $48_C$. The switching means 48 further has an OFF position.

The second side of the A.C. excitation is connected to one side of the inner envelope 14 by means of the portion 32 of base 30 when lamp 10 is inserted into socket 44. The portion 34, when the lamp 10 is inserted into socket 44, is connected to the LOW and HIGH contacts of the switching means 48. The portion 36, when the lamp 10 is inserted into socket 44, is connected to the MEDIUM and HIGH contacts of the switching means 48.

The operating circuit of FIG. 2, comprised of diodes 40, and 42 and the ballast filament 18 provides three levels of illumination developed by the light source 14 of lamp 10. At the LOW setting of the switching means 48 the second diode 42 is placed in series with the filament 16 of inner envelope 14 so as to provide an excitation voltage of about 84 volts yielding the lowest level of illumination for lamp 10. The 84 volt operation is achieved by the diode 42 only being conductive during one-half cycle of the applied A.C. excitation 46.

At the high setting of the switching means 48 the first 40 and second 42 diodes are placed into an anti-parallel arrangement and in series with the inner envelope 14 to provide an excitation of about 120 volts; more particularly about 119 volts because of the voltage drops across diodes 40 and 42. This 119 volts of excitation yields the highest level of illumination for lamp 10. At both the high and low settings of switching means 48 only a small amount, approximately 0.5 watt, of diode losses are incurred. With regard to the efficacy of the inner envelope, operating the inner envelope at the high setting with its two diode configuration (full-wave operation) provides an efficacy which is approximately twice that obtained during the low setting with its single diode configuration (half-wave operation).

At the medium position of the switching means 48, the ballast filament 18 is placed in parallel with the diode 40 and acts to limit the current to inner envelope 14 so that a desired intermediate light level for lamp 10 is produced. The desired intermediate light level is determined by the resistive value selected for the ballast filament 18 which, in turn, determines the intermediate operating voltage for inner envelope 14. The intermediate operating voltage may be in the range of about 95 volts to about 115 volts. The 95 and 115 intermediate operating voltages respectively represent 79% and 96% of the high operating voltage. Similarly, the 95 and 115 intermediate voltages respectively yields 60% and 90% of the lumen output obtained from the inner envelope during its high operation voltage mode. The selection of the resistive value for the ballast filament 18 along with a further related operation of the operating circuit of FIG. 2 is further shown in FIG. 3.

Figure 3:
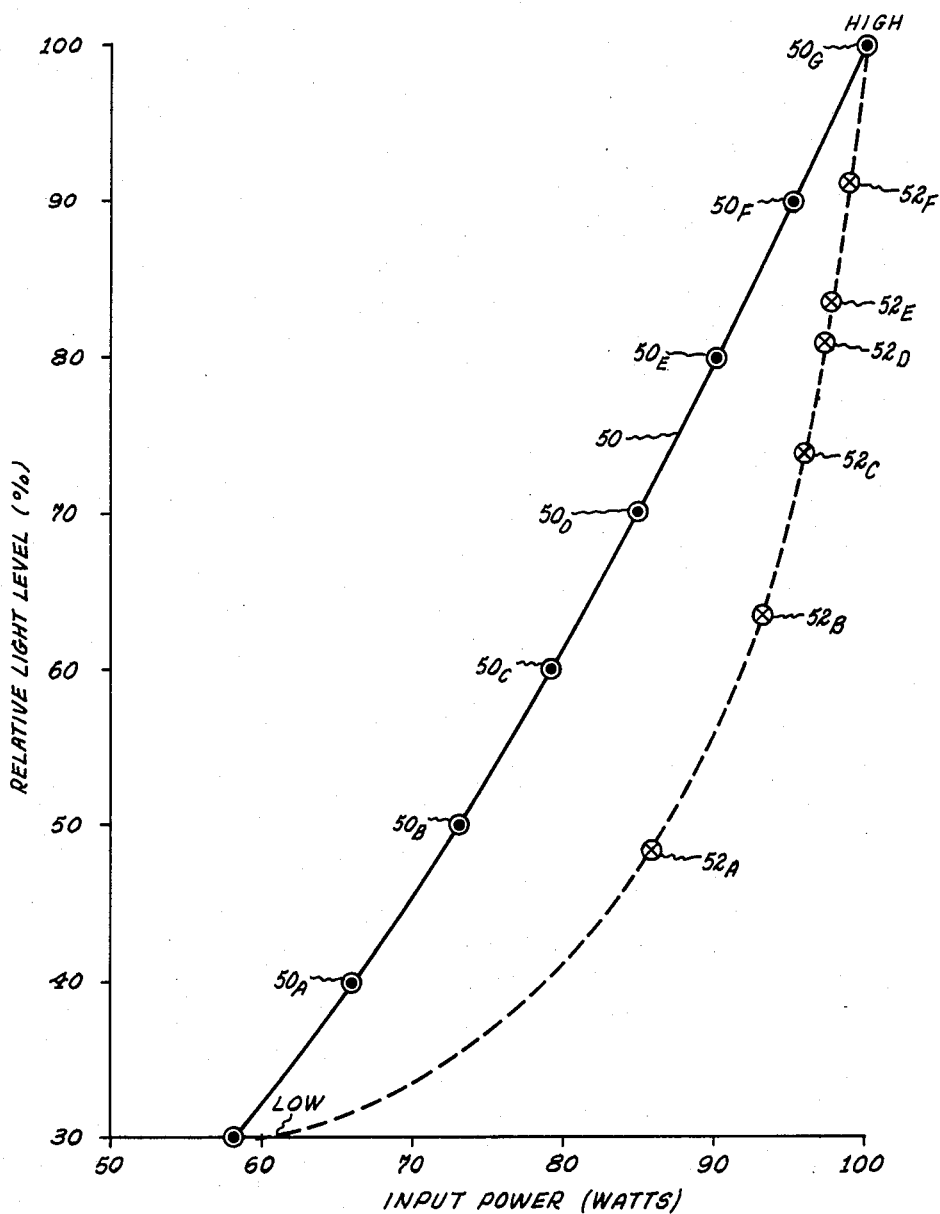
FIG. 3 is a response curve illustrating the power dissipation relative to an ideally operated inner envelope and to the actual operation of the inner envelope cooperating with the ballast filament in accordance with the embodiment of FIG. 2.

FIG. 3 has a X axis labeled INPUT POWER, given in watts, and a Y axis labeled RELATIVE LIGHT LEVEL given in percentage(%). FIG. 3 illustrates a first plot 50 and a second plot 52. The plot 50 shows the light level versus input power for a 100 watt filament 16 lodged within the inner envelope 14 and supplied with current by an ideal lossless operating circuit not having a ballast filament 18. The plot 52 shows the light level versus input power for a 100 watt filament 16 lodged within the inner envelope 14 and supplied with current by the operating circuit of FIG. 2 having the ballast filament 18.

The plot 50 shows point segments, illustrated by circles, $50_A$, $50_B$, $50_C$, $50_D$, $50_E$, $50_F$, and $50_G$ corresponding to RELATIVE LIGHT LEVELS in % of 40, 50, 60, 70, 80, 90 and 100, respectively. The plot 52 shows point segments, illustrated by X's, $52_A$, $52_B$, $52_C$, $52_D$, $52_E$ and $52_F$ corresponding to resistive values for the ballast filament 18 of 100 Ω, 53 Ω, 33 Ω, 20 Ω, 17 Ω and 10 Ω, respectively.

The plot 52 for the 100 watt filament is a complex function of the electrical resistive value selected for the ballast filament 18. For RELATIVE LIGHT LEVELS, herein termed L, in the intermediate 60% to 96% lumen range of interest previously discussed, the resistive value of the ballast filament, herein termed R, is closely approximated by the log function and given by the following relationship:

$$R = -106 \ln \frac{L}{100} \quad (1)$$

where L has a value in the range of about 60 to 96. If the value of R is known, the value of L may be obtained by the following relationship:

$$L = 100\, e^{\frac{-R}{106}} \quad (2)$$

The power dissipated by the ballast filament when the switching means 48 is placed into the MEDIUM contact is at value of the plot 50 minus the value shown on plot 52. For example, at the 80% RELATIVE LIGHT LEVEL (segment $50_E$) a ballast filament 18 having a resistive 25 ohm value (interpolating between plots $52_C$ and $52_D$) dissipates approximately 5 watts. It is estimated (not shown in FIG. 3) that for a 150 watt filament for inner envelope 14 a ballast filament of 15 ohms would dissipate about 10 watts. From FIG. 3 it should be noted, that the highest power losses are incurred at the higher resistive values of the ballast filament 18 so the lower resistive values for the ballast filament 18 are preferred for lamp 10.

The lamp 10 is provided with multi-levels of illumination. The three described levels of illumination are obtained by the operating circuit of the present invention supplying the inner envelope with the LOW, MEDIUM and HIGH operating voltages. These LOW, MEDIUM and HIGH voltages operate the inner envelope containing the halogen additive in such a manner so as to avoid any noticeable wall blacking of the inner envelope and inhibit any detrimental chemical reaction of the halogen attacking the filament and support members of the inner envelope itself.

Figure 4:
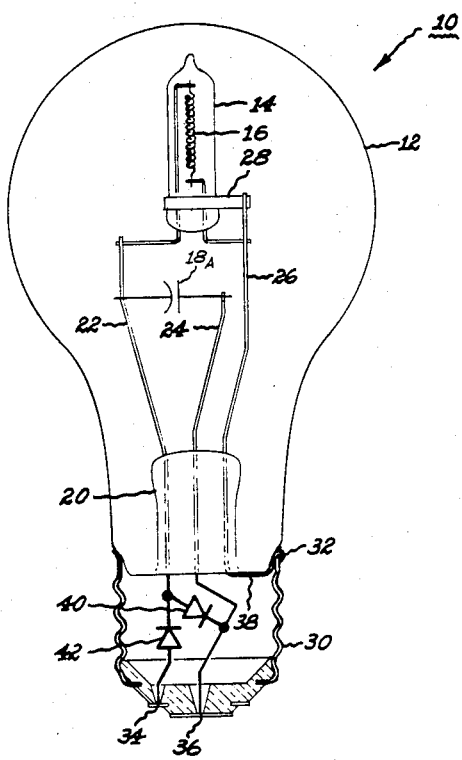
FIG. 4 schematically illustrate a three (3)-way incandenscent lamp in accordance with another embodiment of the present invention.

Although the hereinbefore discussion was related to selecting the resistive value of the ballast filament to obtain the intermediate RELATIVE LIGHT LEVEL, it should be recognized that other devices such as resistors with their resistive values and capacitor and inductors with their electrical impedance may be utilized in place of the ballast filament 18. A capacitor 18A shown in FIG. 4 would provide a more efficient means of limiting current in that only fractional power would be dissipated by same, but size and cost of currently-available devices make these devices less desirable than a ballast resistor or filament. It is important that all selected devices provide a current limiting function to the inner envelope and all devices be capable of being lodged within the confines of the lamp itself. It has been determined that if a capacitor was selected as a ballast element, the capacitor would have a value of about 20 to 30 microfarads. If a current limiting or ballast device other than the incandescent supplementary light source ballast filament is chosen, this other device need not be spatially disposed within the outer envelope. Further, with regard to the diodes 40 and 42 lodged within the base 30 of lamp 10, the harsh temperature environment in which these diodes are placed should be taken into account. The selected diodes 40 and 42 must be high temperature reliant diodes capable of withstanding a temperature environment of up to about 125° C.

It should now be appreciated that the present invention provides for a three (3)-way incandescent lamp employing a single inner envelope having a tungsten filament and a halogen additive along with a relatively high pressure fill-gas, wherein the inner envelope provides for an enhanced light source for the incandescent lamp 10. The operating circuit of FIG. 2 employs a ballast or current-limiting device along with the inherently high temperature reliant diodes.

It should be further appreciated that the use of a single inner envelope reduces or substantially eliminates the need of a complicated structural arrangement for the spatially disposed inner envelope within the lamp itself.

What I claim as new and desire to secure by Letters Patent of the United States is:

1. An improved incandescent lamp having multi-levels of illumination comprising:
   (a) an outer envelope;
   (b) an inner envelope containing a filament, and a halogen additive along with a relatively high pressure fill-gas;
   (c) a ballast element;
   (d) a glass stem having structural and electrical means for spatially disposing said inner envelope within said outer envelope and for electrically connecting to both said inner envelope and said ballast element;
   (e) an electrically conductive base connected to said electrical means of said glass stem and comprising first, second, and third conductive portions adapted to mate with an electrical socket, said socket having switching means among a first, a second and third contacts which selectively routes a first side of an applied electrical A.C. excitation to said first, second and third contacts, a first lead-in of said inner envelope being connected to said first conductive portion of said base which is attached to a first terminal of said socket having a second side of said electric A.C. excitation applied thereto, a second lead-in of said inner envelope being connected to a first end of said ballast element having its other end connected to said second conductive portion of said base, said switching means having a second terminal connected to said first side of said electrical A.C. excitation, said first and third contacts of said switching means and said second and third contacts of said switching means being respectively interconnected; and
   (f) an operating circuit including said ballast element and further comprising a first and a second diode lodged within the confines of said electrically conductive base;
   said first diode having its anode connected to said first end of said ballast element and its cathode connected to said second conductive portion of said base; and
   said second diode having its cathode connected to said first end of said ballast element and its anode connected to said third conductive portion of said base.

2. An improved incandescent lamp according to claim 1 wherein the multi-levels of illumination are a LOW level, an INTERMEDIATE level and a HIGH level, said INTERMEDIATE LEVEL having a RELATIVE LIGHT LEVEL, L, as compared to said HIGH level, said ballast element having a predetermined electrical impedance R, said predetermined electrical impedance R being selected in accordance with the relationship:

$$R = -106 \ln \frac{L}{100}$$

where L has a value in the range of about 60 to about 96.

3. An improved incandescent lamp according to claim 2 wherein said ballast element is an incandescent filament which is spatially disposed within said outer envelope.

4. An improved incandescent lamp according to claim 2 wherein said ballast element is a capacitor having a value in the range of 20 to about 30 microfarads.

* * * * *